US011157381B2

(12) United States Patent
Tateishi et al.

(10) Patent No.: US 11,157,381 B2
(45) Date of Patent: Oct. 26, 2021

(54) DISPLAY CONTROL METHOD AND DISPLAY CONTROL DEVICE

(71) Applicant: FUJITSU LIMITED, Kawasaki (JP)

(72) Inventors: Naoki Tateishi, Nagoya (JP); Masatoshi Takamiya, Nagoya (JP); Koki Ariga, Nagakute (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/032,199

(22) Filed: Jul. 11, 2018

(65) Prior Publication Data

US 2019/0034310 A1 Jan. 31, 2019

(30) Foreign Application Priority Data

Jul. 26, 2017 (JP) ............................. JP2017-144883

(51) Int. Cl.
*G06F 11/34* (2006.01)
*H04L 12/26* (2006.01)
(Continued)

(52) U.S. Cl.
CPC ...... *G06F 11/3409* (2013.01); *G06F 11/3006* (2013.01); *G06F 11/3051* (2013.01);
(Continued)

(58) Field of Classification Search
CPC ............ G06F 11/3006; G06F 11/3055; G06F 11/3409; G06F 11/32; G06F 11/323;
(Continued)

(56) References Cited

U.S. PATENT DOCUMENTS 7,406,399 B2 * 7/2008 Furem ................ G05B 19/0428
702/182
7,475,122 B2 * 1/2009 Azpitarte ............. G05B 19/042
709/217
(Continued)

FOREIGN PATENT DOCUMENTS

JP 2015-115018 6/2015
WO 2013/001609 1/2013

OTHER PUBLICATIONS

Kavulya SP, Daniels S, Joshi K, Hiltunen M, Gandhi R, Narasimhan P. Draco: Statistical diagnosis of chronic problems in large distributed systems. In IEEE/IFIP International Conference on Dependable Systems and Networks (DSN 2012) Jun. 25, 2012 (pp. 1-12). IEEE. (Year: 2012).*

(Continued)

*Primary Examiner* — James N Fiorillo
(74) *Attorney, Agent, or Firm* — Fujitsu Patent Center

(57) ABSTRACT

The procedure includes referring to data including information on an operation task performed with respect to each of a plurality of devices, the data being associated with each of the plurality of devices, extracting a first device in which a number of operation tasks performed during a specific period satisfies a criterion, displaying the information on the operation task performed during the specific period with respect to the first device, in association with the first device, upon receiving designation of a time or a first time zone, referring to the data, extracting a second device in which the number of operation tasks performed in a second time zone depending on the time or the first time zone satisfies a criterion, and displaying the information on the operation task performed in the second time zone with respect to the second device, in association with the second device.

8 Claims, 12 Drawing Sheets

(51) Int. Cl.
*H04L 12/24* (2006.01)
*G06F 11/30* (2006.01)
*G06F 11/32* (2006.01)

(52) U.S. Cl.
CPC .......... *G06F 11/32* (2013.01); *H04L 41/0806* (2013.01); *H04L 41/5051* (2013.01); *H04L 41/5074* (2013.01); *H04L 43/04* (2013.01); *H04L 43/08* (2013.01)

(58) Field of Classification Search
CPC ............. G06F 11/3051; G06F 11/3017; G06F 11/3476; G06F 11/14; G06F 11/30; G06F 11/34; G06F 11/2205; G06F 11/2247; G06F 9/46; G06F 9/50; H04L 41/50; H04L 41/145; H04L 41/0853; H04L 41/5009; H04L 41/0806; H04L 41/5051; H04L 41/5074; H04L 43/04; H04L 43/08; H04L 12/24; H04L 12/26
USPC .................................. 709/217, 224
See application file for complete search history.

(56) References Cited

U.S. PATENT DOCUMENTS

| | | | | |
|---|---|---|---|---|
| 9,606,886 | B2* | 3/2017 | Li | H04L 43/062 |
| 9,846,599 | B1* | 12/2017 | Baranczyk | G06F 16/21 |
| 10,146,609 | B1* | 12/2018 | Leverich | G06F 11/079 |
| 2004/0153437 | A1* | 8/2004 | Buchan | G06Q 10/06 |
| 2009/0271504 | A1* | 10/2009 | Ginter | H04L 41/0806 |
| | | | | 709/220 |
| 2011/0099146 | A1* | 4/2011 | McAlister | G06F 11/2069 |
| | | | | 707/634 |
| 2012/0331127 | A1* | 12/2012 | Wang | G06F 9/4862 |
| | | | | 709/224 |
| 2013/0007262 | A1* | 1/2013 | Akatoki | G06F 11/32 |
| | | | | 709/224 |
| 2013/0116976 | A1* | 5/2013 | Kanemasa | G06F 11/3419 |
| | | | | 702/186 |
| 2013/0151689 | A1* | 6/2013 | GanapathyRaj | H04L 43/16 |
| | | | | 709/224 |
| 2015/0172148 | A1* | 6/2015 | Ishida | H04L 41/12 |
| | | | | 709/224 |
| 2016/0094431 | A1* | 3/2016 | Hall | H04L 67/02 |
| | | | | 709/224 |
| 2016/0127204 | A1* | 5/2016 | Ozaki | H04L 43/06 |
| | | | | 709/224 |
| 2016/0321115 | A1* | 11/2016 | Thorpe | G06Q 10/0631 |
| 2017/0017232 | A1* | 1/2017 | Nishiuchi | G05B 23/0256 |
| 2017/0046374 | A1* | 2/2017 | Fletcher | G06F 3/0482 |
| 2017/0126472 | A1* | 5/2017 | Margalit | H04L 43/08 |
| 2017/0126517 | A1* | 5/2017 | Crabtree | H04L 41/145 |
| 2017/0147681 | A1* | 5/2017 | Tankersley | G06F 11/321 |
| 2017/0149690 | A1* | 5/2017 | Le Rudulier | H04L 43/0817 |
| 2018/0278497 | A1* | 9/2018 | Hung | H04L 43/0876 |
| 2018/0302276 | A1* | 10/2018 | Lu | H04L 43/04 |
| 2019/0104014 | A1* | 4/2019 | Margalit | G06F 11/3006 |

OTHER PUBLICATIONS

Kavulya SP, Daniels S, Joshi K, Hiltunen M, Gandhi R, Narasimhan P. Draco: Statistical diagnosis of chronic problems in large distributed systems. In IEEE/IFIP International Conference on Dependable Systems and Networks (DSN 2012) Jun. 25, 2012 (pp. 1-12). IEEE. (Year: 2012) (Year: 2012).*

Japanese Office Action dated Mar. 16, 2021 for corresponding Japanese Patent Application No. 2017-144883, with English Translation, 8 pages.

* cited by examiner

| TASK ID | EXECUTION DATE AND TIME | SERVICE NAME | HOST NAME | NUMBER OF TICKETS | TITLE | ... |
|---|---|---|---|---|---|---|
| 500 | 2017/5/10 3:00 | Service-A | VCUFROGGVGF0001 | 1 | APPLYING SECURITY PATCH TO BUSINESS APPLICATION | |
| 500 | 2017/5/10 3:00 | Service-A | VCUFROGGVGF0002 | 1 | APPLYING SECURITY PATCH TO BUSINESS APPLICATION | |
| 510 | 2017/5/10 3:10 | Service-B | VCUFROGGVGF0001 | 1 | APPLYING SECURITY MODIFICATION | |
| ... | | | | | | |

FIG. 3

| INCIDENT ID | DATE AND TIME | HOST NAME | TITLE | NUMBER OF TICKETS | ... |
|---|---|---|---|---|---|
| 20 | 2017/5/11 9:00 | VCUFROGGVGF0001 | ERROR: CPU USAGE RATE OF DB IS TOO HIGH (AP:10432) | 1 | |
| ... | | | | | |

HOST NAME: VCUFROGGVGF0002     722

| DATE AND TIME | CPU USAGE RATE | FREE MEMORY CAPACITY | ... |
|---|---|---|---|
| 2017/5/11 8:59 | 40.0 | 1800 | |
| 2017/5/11 9:00 | 100.0 | 0 | |
| 2017/5/11 9:01 | 100.0 | 0 | |
| ... | | | |

DISPLAY CONTROL METHOD AND DISPLAY CONTROL DEVICE

CROSS-REFERENCE TO RELATED APPLICATION

This application is based upon and claims the benefit of priority of the prior Japanese Patent Application No. 2017-144883, filed on Jul. 26, 2017, the entire contents of which are incorporated herein by reference.

FIELD

The embodiments discussed herein are related to a display control method and a display control device.

BACKGROUND

There has been known a technology for displaying performance information or displaying a log of a business system when monitoring a business system. For example, there has been known a technology which associates and records a connection relationship of components and a construction time of the business system when the business system is virtually constructed using a plurality of components provided by a data center. In the technology, when a change in the connection relationship of the components is detected, the changed connection relationship of the components and a change time are associated and recorded. In the technology, the data center collects monitoring information indicating an operating state of the component and a monitoring time, and associates and records the monitoring information and the monitoring time. Further, according to the technology, when a management terminal receives time specifying information, the management terminal specifies and outputs a configuration and the monitoring information of the business system at a designated time based on an identifier uniquely assigned to the component.

In another technology, a monitoring system numerically quantifies the change in configuration or state of a monitored device or a monitored object of a component of the monitored device and displays a change value. According to the technology, when a plurality of monitoring information acquisition intervals is used, the change value may be calculated and displayed for each of a plurality of monitored objects. In addition, a time axis of a time series graph of a monitored numerical value and the time axis of the time series graph of the change value may be collected and displayed.

Related techniques are disclosed in, for example, Japanese Laid-Open Patent Publication No. 2015-115018 and International Publication Pamphlet No. WO 2013/001609.

SUMMARY

According to an aspect of the invention, a computer-readable non-transitory recording medium storing a program that causes a computer to execute a procedure, a procedure includes referring to data including information on an operation task performed with respect to each of a plurality of devices, the data being associated with each of the plurality of devices, extracting a first device, among the plurality of devices, in which a number of operation tasks performed during a specific period satisfies a criterion, displaying the information on the operation task performed during the specific period with respect to the first device, in association with the first device, upon receiving designation of a time or a first time zone, referring to the data including the information on the operation task, extracting a second device, among the plurality of devices, in which the number of operation tasks performed in a second time zone depending on the time or the first time zone satisfies a criterion, and displaying the information on the operation task performed in the second time zone with respect to the second device, in association with the second device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of an operation history DB according to a first embodiment;

FIG. 3 is a diagram illustrating an example of an incident DB according to the first embodiment;

FIG. 4 is a diagram illustrating an example of a performance DB according to the first embodiment;

DESCRIPTION OF EMBODIMENTS

Figure 1:
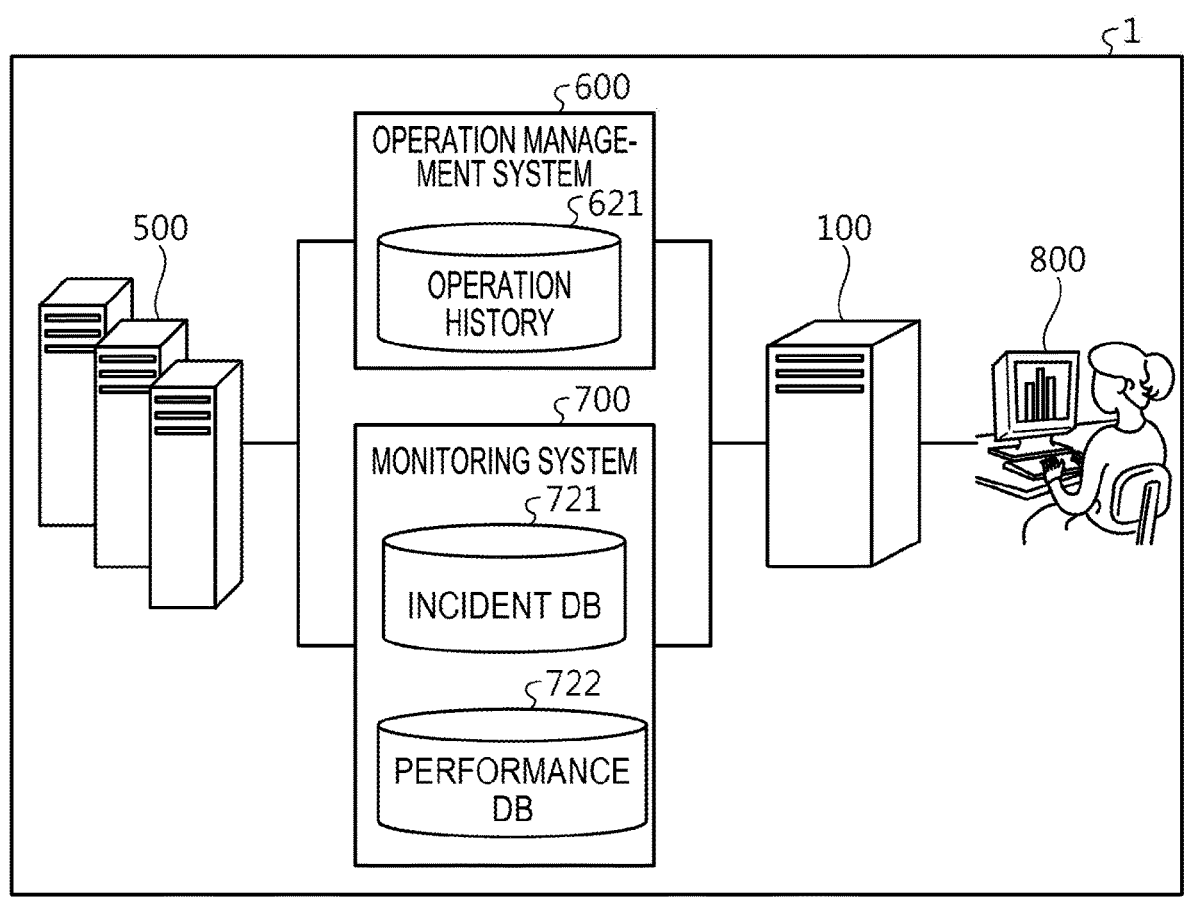
FIG. 1 is a diagram illustrating an example of a system configuration.

In an operation and management site of a business system, personnel for operation and monitoring are divided for efficiency improvement and mistake reduction, and a task is carried out individually. In general, monitoring of the business system is carried out by monitoring performance information and a log of the business system, and the changed contents of the business system which is based on an operation task by the operation personnel are not monitored. Therefore, when a failure occurs due to a change in the business system based on the operation task such as the renewal of infrastructure or application of a security patch, it takes time to investigate and cope with a cause. In order to reveal the cause of the failure by a changed task, a task or an incident having a larger influence on the failure may be specified among the information on a huge number of operation tasks or the log of the business system.

Hereinafter, an embodiment of technology that may compress a task having a high influence degree on an event will be described in detail with reference to drawings. In addition, the present disclosure is not limited by the embodiments. Further, the embodiments described below may be appropriately combined within a scope not to cause a contradiction. In addition, in the following embodiments, the same reference numerals are given to the same parts as those illustrated in the drawings described above, and redundant descriptions are omitted.

First Embodiment

[System Configuration]

An operation monitoring system including a display control device according to the embodiment will be described with reference to FIG. 1. FIG. 1 is a diagram illustrating one example of a system configuration. The operation monitoring system 1 illustrated in FIG. 1 includes a display control device 100, a business system 500, an operation management system 600, a monitoring system 700, and an operator terminal 800. A configuration of the display control device 100 will be described later in detail.

In the embodiment, the display control device 100 and the operator terminal 800, the operation management system 600, the monitoring system 700, and the display control device 100 are communicably connected via a wireless or wired network. As one aspect of such a network, mobile communication such as mobile phone and any type of communication network such as Internet, local area network (LAN) or virtual private network (VPN) may be adopted regardless of a wired or wireless network. Further, FIG. 1 illustrates a case where one operation management system 600, one monitoring system 700, and one operator terminal 800 are provided. However, the operation monitoring system 1 may include a plurality of operation management systems 600, monitoring systems 700, and operator terminals 800.

The business system 500 illustrated in FIG. 1 is a system to be monitored in the embodiment. The business system 500 is constituted by, for example, a plurality of physical servers or clouds. The business system 500 has a plurality of hosts. Further, although one host corresponds to, for example, one physical server, the one host is not limited thereto and may be implemented by a virtual machine on the cloud. In addition, the business system 500 is an example of a system and a plurality of hosts is an example of a plurality of devices.

The operation management system 600 is a system that manages information related to an operation task for each host on the business system 500. In the embodiment, the operation task may include all the operations performed on the business system 500, which include application of patches to the business system 500, updating of infrastructure such as addition of a physical memory to a server, and application of security correction.

The operation management system 600 has an operation history DB 621. The operation history DB 621 stores information on the operation task performed on the business system 500. FIG. 2 is a diagram illustrating an example of an operation history DB according to a first embodiment. As illustrated in FIG. 2, the operation history DB 621 stores "execution date and time," "service name" "host name," "the number of tickets," and "title" in association with "task ID." Further, the information stored in the operation history DB 621 is input by the operation management system 600 that acquires the information on the operation task in advance, for example, but the information is not limited thereto and may be input in advance by an administrator of the operation management system 600. In addition, the operation history DB 621 is an example of a storage unit.

In FIG. 2, a task identifier (ID) indicates an identifier for uniquely identifying the operation task for the host on the business system 500. The "execution date and time" indicates a date and time when the operation task is performed. The "service name" indicates a name of a service for the operation task. The "host name" indicates the target host for the operation task. The "number of tickets" indicates the number of process of the operation task. The "title" indicates specific contents of the operation task. Further, as illustrated in FIG. 2, the operation task of the same task ID may be performed for a plurality of target hosts.

Referring back to FIG. 1, the monitoring system 700 is a system for monitoring a state of the business system 500. In the embodiment, the state of the business system 500 monitored by the monitoring system 700 is, for example, a CPU usage rate or a free memory capacity of each host, but is not limited thereto and also includes information such as a throughput to a disk. Further, in the embodiment, the monitoring system 700 may further monitor, for example, an incident which occurs in each host.

The monitoring system 700 includes an incident DB 721 and a performance DB 722. The incident DB 721 stores information on incidents that occur in the business system. FIG. 3 is a diagram illustrating an example of an incident DB according to the first embodiment. As illustrated in FIG. 3, the incident DB 721 stores "date and time," "host name," "title," and "the number of tickets" in association with "incident ID." Further, the information stored in the incident DB 721 is input by the monitoring system 700 that receives a notification for the occurrence of the incident in advance, for example, but is not limited thereto and may be input in advance by an operator of the monitoring system 700. In addition, the incident DB 721 is an example of the storage unit.

In FIG. 3, the incident ID indicates an identifier for uniquely identifying the incident which occurs in the host on the business system 500. The "time and date" indicates a date and time when the incident occurs. The "host name" indicates a host where the incident occurs. The "title" indicates the specific contents of the incident. The "number of tickets" indicates the number of process of the incident. Further, when the same incident occurs simultaneously in the plurality of hosts, the incident DB 721 stores a record to which the same incident ID is assigned for each host where the incident occurs.

The performance DB 722 stores the information on the performance such as the CPU usage rate or the free memory capacity of each host on the business system 500. FIG. 4 is a diagram illustrating an example of a performance DB according to the first embodiment. As illustrated in FIG. 4, the performance DB 722 stores "CPU usage rate" and "free memory capacity" for each "date and time." Further, the information stored in the performance DB 722 is input in advance, for example, every time the monitoring system 700 acquires the performance of each host of the business system 500 (e.g., every one minute). In addition, the performance DB 722 stores, for example, one table for each host of the business system 500. Further, the performance DB 722 is an example of the storage unit.

The display control device 100 according to the embodiment compresses and displays information that matches a condition among the information acquired from the operation management system 600 and the monitoring system 700. For example, the display control device 100 extracts from the operation management system 600 a host in which the number of operation tasks performed in a specific period meets a criterion out of the plurality of hosts, and associates the information on the operation task with the host and displays the host associated with the information on the operator terminal 800. Further, when the display control device 100 receives designation of a time or a time zone, the display control device 100 newly extracts a host in which the number of operation tasks performed in the time zone depending on the designated time or time zone meets a criterion among the plurality of hosts. In addition, the display control device 100 associates the extracted host and the information on the operation task, and displays the associated host and information on the operator terminal 800.

The display control device 100 acquires, from the monitoring system 700, for example, the performance information of each of the plurality of hosts included in the business system 500 and a time at which the performance information is measured. The display control device 100 acquires from the operation management system 600 the information on the operation task performed on each of the plurality of hosts and the time at which the operation task is performed. Then, the display control device 100 displays on the operator terminal 800 performance information associated with the time within the specific period out of the acquired performance information and information on the operation task associated with the time within the specific period out of the acquired information on the operation task.

The operator terminal 800 requests the display control device 100 for processing and displays a processing result by the display control device 100. For example, the operator terminal 800 is operated by the operator and when the operator terminal 800 receives a display instruction concerning operation monitoring, the operator terminal 800 transmits a processing request to the display control device 100. Upon receiving the processing result relating to the operation monitoring from the display control device 100, the operator terminal 800 displays the received processing result on a display unit such as a display. Further, the operator terminal 800 receives an operation by the operator for the displayed processing result, transmits a processing request corresponding to the operation to the display control device 100, and displays the processing result received from the display control device 100 on the display unit.

As described above, since the display control device according to the embodiment extracts a device in which the criteria of the number of operation tasks within the time period satisfies the criterion among the plurality of devices and associates and displays the information on the operation task performed depending on the designated time zone with the device, the display control device may compress a task having a high influence degree.

[Functional Block]

Figure 5:
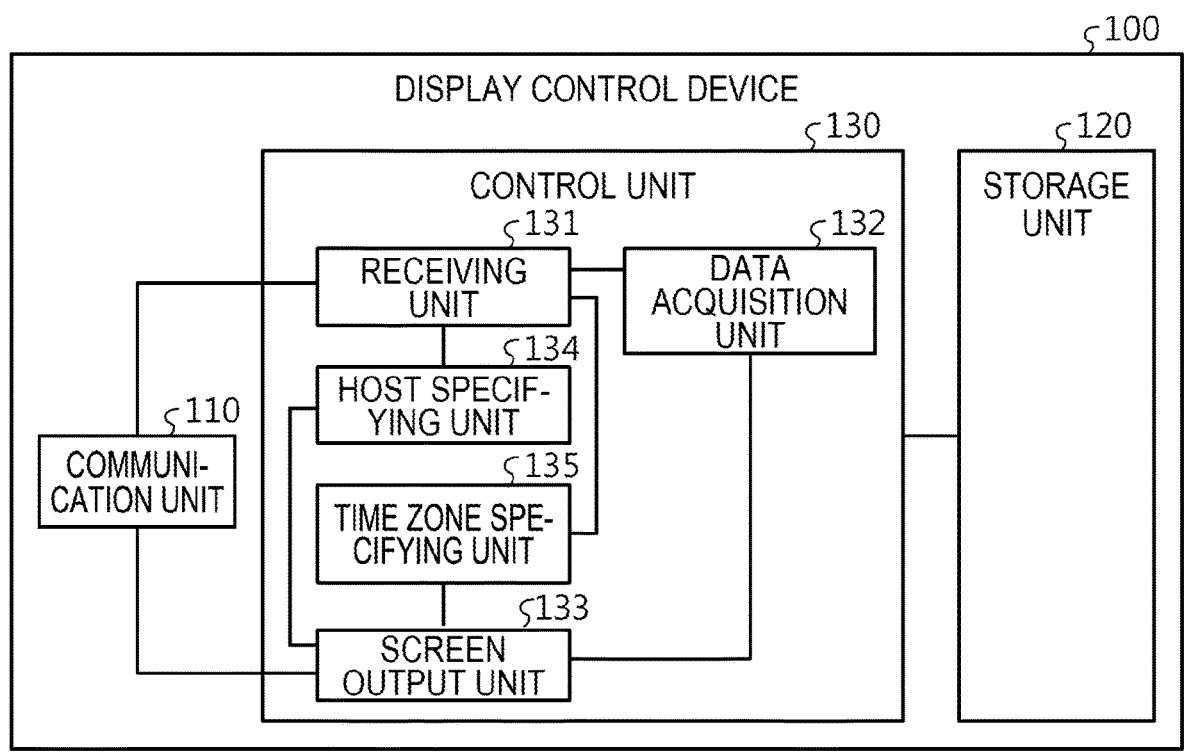
FIG. 5 is a diagram illustrating an example of a display control device according to the first embodiment.

Next, the display control device 100 according to the embodiment will be described with reference to FIG. 5. FIG. 5 is a diagram illustrating an example of a display control device according to the first embodiment. The display control device 100 illustrated in FIG. 5 includes a communication unit 110, a storage unit 120, and a control unit 130. Further, the display control device 100 according to the embodiment is, for example, a computer such as a server computer that receives the processing request from the operator terminal 800, but is not limited thereto. The display control device 100 may be a stand-alone type computer such as a personal computer or may be a portable computer such as, for example, a smart phone, a tablet, or a notebook computer.

The communication unit 110 controls communication with other computers, such as the operation management system 600, the monitoring system 700, and the operator terminal 800, regardless of a wired or wireless type. The communication unit 110 is, for example, a communication interface such as a network interface card (NIC).

The storage unit 120 stores, for example, a program executed by the control unit 130 and various kinds of information such as data acquired from the operation management system 600 or the monitoring system 700. The storage unit 120 corresponds to a semiconductor memory device such as a random access memory (RAM), a read only memory (ROM), or a flash memory, or a storage device such as a hard disk drive (HDD).

The control unit 130 is a processing unit that takes charge of overall processing of the display control device 100. The control unit 130 is implemented, for example, by executing a program stored in an internal storage device with the RAM as a task area by, for example, a central processing unit (CPU), or a micro processing unit (MPU). In addition, the control unit 130 may be implemented by an integrated circuit such as an application specific integrated circuit (ASIC) or a field programmable gate array (FPGA).

The control unit 130 includes a receiving unit 131, a data acquisition unit 132, a screen output unit 133, a host specifying unit 134, and a time zone specifying unit 135. Further, the receiving unit 131, the data acquisition unit 132, the screen output unit 133, the host specifying unit 134, and the time zone specifying unit 135 are examples of electronic circuits included in a processor or an example of a process executed by the processor.

The receiving unit 131 inputs and outputs information in and from the operator terminal 800 through the communication unit 110. Upon receiving the processing request from the operator terminal 800, the receiving unit 131 outputs a processing start instruction to the data acquisition unit 132. Further, upon receiving the information on the host selection operation from the operator terminal 800, the receiving unit 131 outputs a host compression instruction to the host specifying unit 134. In addition, upon receiving the information on a time zone selection operation, the receiving unit 131 outputs a time zone compression instruction to the time zone specifying unit 135.

Upon receiving an output of the processing start instruction from the receiving unit 131, the data acquisition unit 132 acquires the information on the operation task from the operation management system 600 through the communication unit 110 simultaneously with the time at which the operation task is performed. Further, the data acquisition unit 132 acquires the information on the incident from the monitoring system 700 together with the time at which the incident occurs. In addition, the data acquisition unit 132 acquires information on the performance of each host such as the CPU usage rate and the free memory capacity from the monitoring system 700 together with the time when the performance is measured. The data acquisition unit 132 stores the acquired information in the storage unit 120 and outputs the stored information to the screen output unit 133.

The screen output unit 133 generates information related to a screen to be displayed on the operator terminal 800 and outputs the generated information to the operator terminal 800 through the communication unit 110. The screen output unit 133 generates information of an initial screen illustrated in FIG. 6 to be described later, for example, using the information output from the data acquisition unit 132. The screen output unit 133 generates, for example, an initial screen including information on the operation task, information on the incident, and information on the performance.

For example, when generating the initial screen, the screen output unit 133 compresses information which satisfies a predetermined criterion in the output information on the operation task. For example, the screen output unit 133 compresses a host in which the number of operation tasks generated during a corresponding initial setting period in the output information on the host is equal to or larger than a predetermined threshold (for example, three). Further, for example, the screen output unit 133 may be configured to compress only hosts in which the number of operation tasks generated during the corresponding initial setting period is included in top five of all hosts.

The screen output unit 133 generates, for example, information of the screen regarding a host compression result illustrated in FIG. 8 to be described later using the information output from the host specifying unit 134. Further, the screen output unit 133 generates, for example, information of the screen regarding a time zone compression result illustrated in FIG. 10 to be described later using the information output from the time zone specifying unit 135.

Upon receiving the output of the host compression instruction, the host specifying unit 134 performs compression processing of information corresponding to a host which meets a condition in the information on the operation task by referring to the storage unit 120. The host specifying unit 134 outputs the information on the compressed host to the screen output unit 133.

The host specifying unit 134 receives, for example, selection of the information on the incident as the host compression instruction. In this case, the host specifying unit 134 selects information on hosts of the same type as the host in which the selected incident occurs as a compression target.

The host specifying unit 134 receives, for example, selection of information on a specific operation task as the host compression instruction. In this case, the host specifying unit 134 selects a host in which the number of operation tasks performed in a time zone including a time when the selected operation task is performed satisfies a predetermined criterion as the compression target.

The host specifying unit 134 may select information on a host of the same type as the host which becomes the target of the selected operation task as a compression target. In addition, the host specifying unit 134 may select a host which becomes the target of the operation task to which a task ID common to the task ID of the selected operation task is assigned as the compression target.

Upon receiving the output of the time zone compression instruction, the time zone specifying unit 135 performs processing of compressing the information on the operation task to information included in the designated time zone by referring to the storage unit 120. The time zone specifying unit 135 outputs the compressed information on the time zone to the screen output unit 133.

For example, the time zone specifying unit 135 receives the output of the time zone compression instruction including the time and the period of the time zone, but is not limited thereto and, for example, may be configured to receive the output of the time zone compression instruction including a specific time. In this case, for example, the time zone specifying unit 135 may regard a predetermined time around the specific time as the designated time zone. [Screen Transition]

Figure 6:
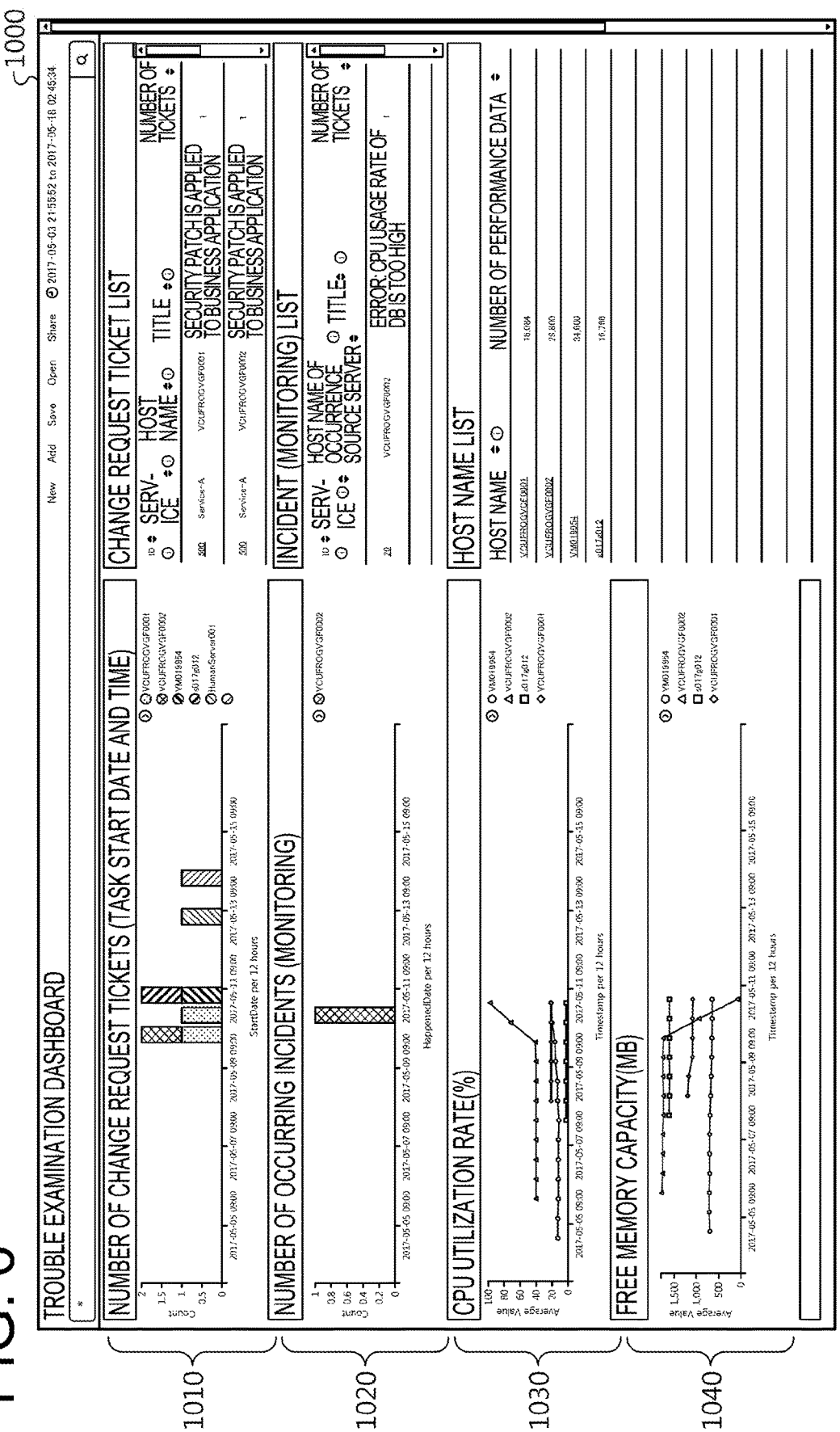
FIG. 6 is a diagram illustrating an example of an initial screen according to the first embodiment.

Transition of a screen generated by the display control device 100 or displayed on the operator terminal 800 by the operation of the operator of the operator terminal 800, according to the processing by the display control device 100 will be described with reference to FIGS. 6 to 10. FIG. 6 is a diagram illustrating an example of an initial screen according to the first embodiment. The initial screen 1000 illustrated in FIG. 6 includes a first item 1010 indicating the number of change request tickets accompanying the operation task for each host on the business system 500 and a second item 1020 indicating the number of incidents which occur in each host of the business system 500. Further, the initial screen 1000 further includes a third item 1030 regarding the CPU usage rate and a fourth item 1040 regarding the free memory capacity as the information on the performance of each host of the business system 500. In addition, in the initial screen, for example, the operation task and incidents that occur during a period of 10 days before a display time as the initial setting period and information on the performance acquired in the initial setting period are displayed. Further, in the initial screen illustrated in FIG. 6, for example, graphs corresponding to respective pieces of information are vertically arranged and displayed so that the time axis of each piece of information is collected.

In FIG. 6, information that the host which the host compressed by the screen output unit 133 satisfies a predetermined criterion among the hosts that become the target of the operation task generated during the corresponding initial setting period is displayed in the first item 1010. In the example illustrated in FIG. 6, for example, all hosts in which the number of operation tasks generated during the corresponding initial setting period is "1" or more are displayed.

In FIG. 6, in the second item 1020, the incident which occurs in the host which is a display target in the first item 1010 is displayed. For example, in the first item 1010, an incident which occurs in "VCUFROGVGF0002" among five hosts displayed in the first item 1010 is displayed.

In FIG. 6, in a third item 1030 and a fourth item 1040, the information regarding the performance acquired in the host which is the display target in the first item 1010 is displayed.

Figure 7:
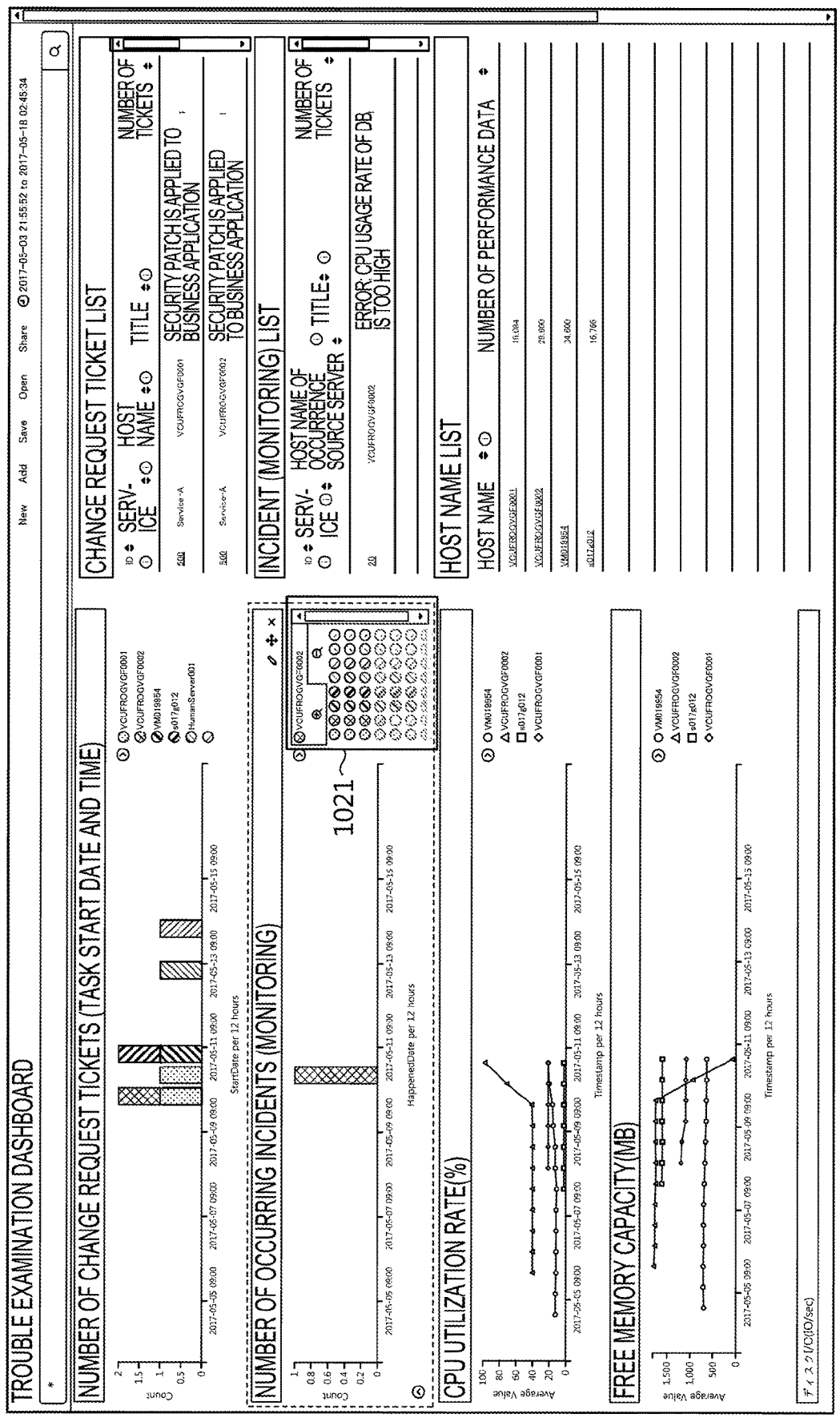
FIG. 7 is a diagram illustrating an example of a host selection operation according to the first embodiment.

In FIG. 6, it may be specified that the incident occurs in the host "VCUFROGVGF0002" and the CPU usage rate and the free memory capacity are set to abnormal values. In this case, the operator terminal 800 receives, for example, an operation of selecting the host in which the incident occurs from the operator. FIG. 7 is a diagram illustrating an example of a host selection operation according to the first embodiment. FIG. 7 illustrates an example of a screen when the operator terminal 800 receives the selection operation of the host "VCUFROGVGF0002" from the operator.

As illustrated in FIG. 7, the operator terminal 800 displays an item 1021 for selecting the host and receives the selection operation of the host by the operator. When the host is selected on the screen illustrated in FIG. 7, the operator terminal 800 transmits the information on the selected host to the display control device 100.

The host specifying unit 134 of the display control device 100 compresses the selected host among the respective hosts displayed in the first item 1010 of FIG. 7 and a host having a large influence based on the selected host. For example, the host specifying unit 134 specifies the host that is the target of the operation task which occurs within the initial setting period for the selected hosts as the host having the large influence. In the embodiment, as illustrated in the first item 1010 of FIG. 7, the operation task for the selected host "VCUFROGVGF0002" is performed with respect to the host "VCUFROGVGF0001."

In such a case, the host specifying unit 134 specifies the host "VCUFROGVGF0001" as the host having the large influence in addition to the selected host "VCUFROGVGF0002." Then, the screen output unit 133 causes the operator terminal 800 to display information on a result of compressing the specified host through the communication unit 110. FIG. 8 is a diagram illustrating an example of a host compression result according to the first embodiment.

Figure 8:
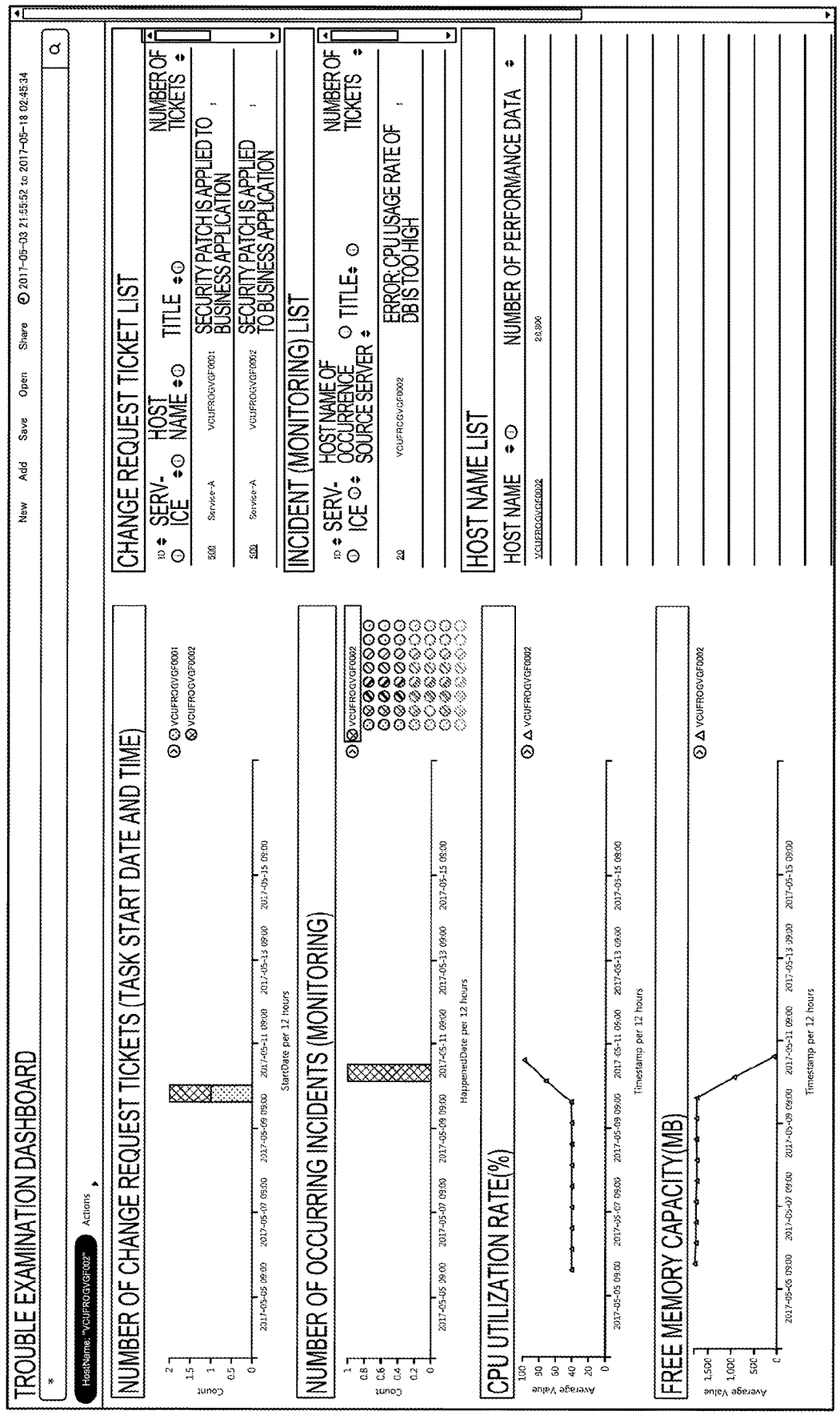
FIG. 8 is a diagram illustrating an example of a host compression result according to the first embodiment.

As illustrated in FIG. 8, in the host compression result, only information on the host "VCUFROGVGF0002" and the host "VCUFROGVGF0001" is displayed. As a result, the display control device 100 may suppress display of information on an operation task having a low influence degree to the operator of the operator terminal 800.

Figure 9:
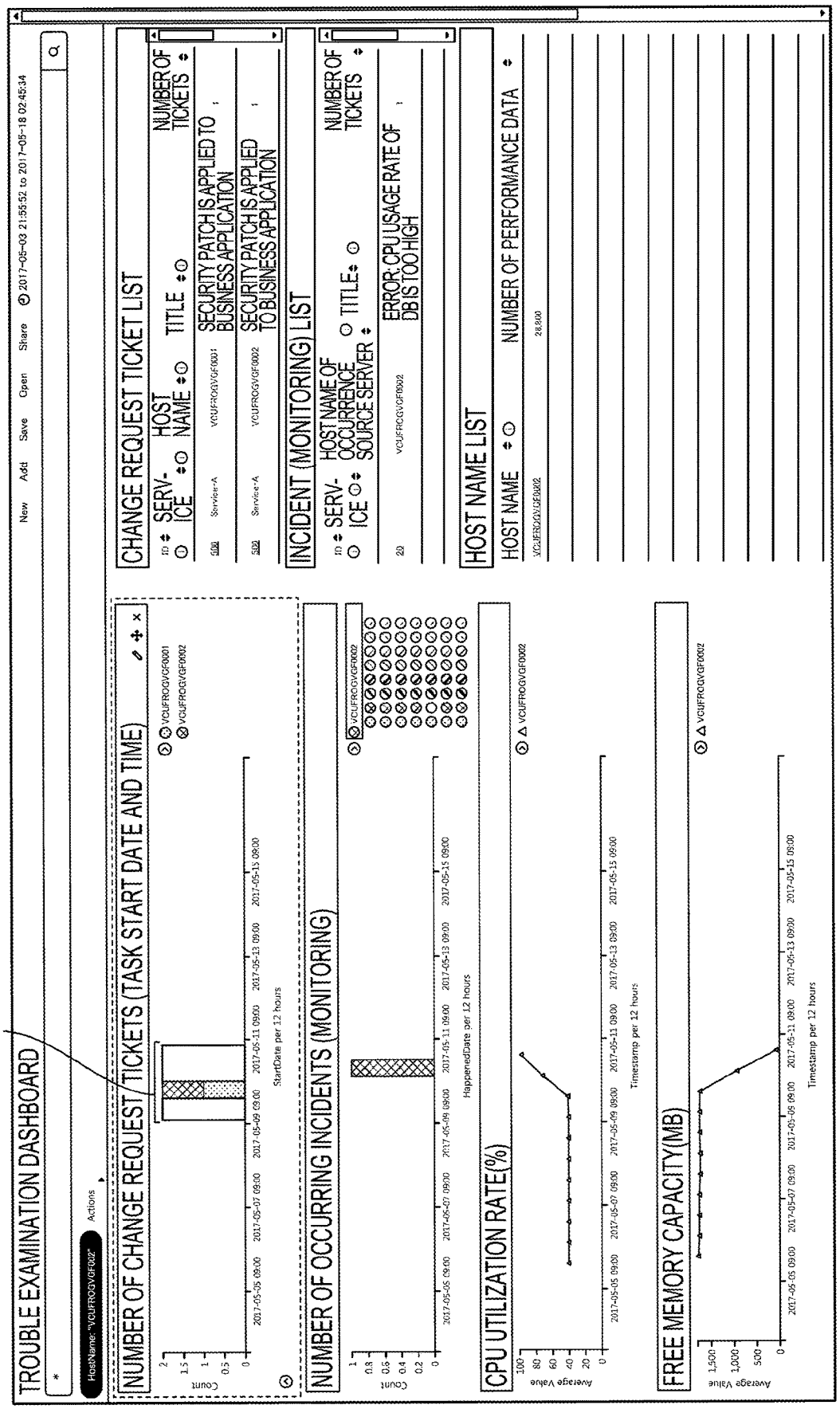
FIG. 9 is a diagram illustrating an example of a time zone selection operation according to the first embodiment.

In FIG. 8, even in the host "VCUFROGVGF0001," it may be inferred that there is a possibility that an event related to the incident which occurs in the host "VCUFROGVGF0002" will occur. In this case, the operator terminal 800 receives, for example, an operation of selecting a time before and after the operation task for the host "VCUFROGVGF0002" from the operator. FIG. 9 is a diagram illustrating an example of a time zone selection operation according to the first embodiment. FIG. 9 illustrates an example of a screen when the operator terminal 800 receives an operation of selecting a time zone 1012 before and after the operation task for the host "VCUFROGVGF0002" from the operator. The operator terminal 800 transmits information on the selected time zone 1012 to the display control device 100.

Figure 10:
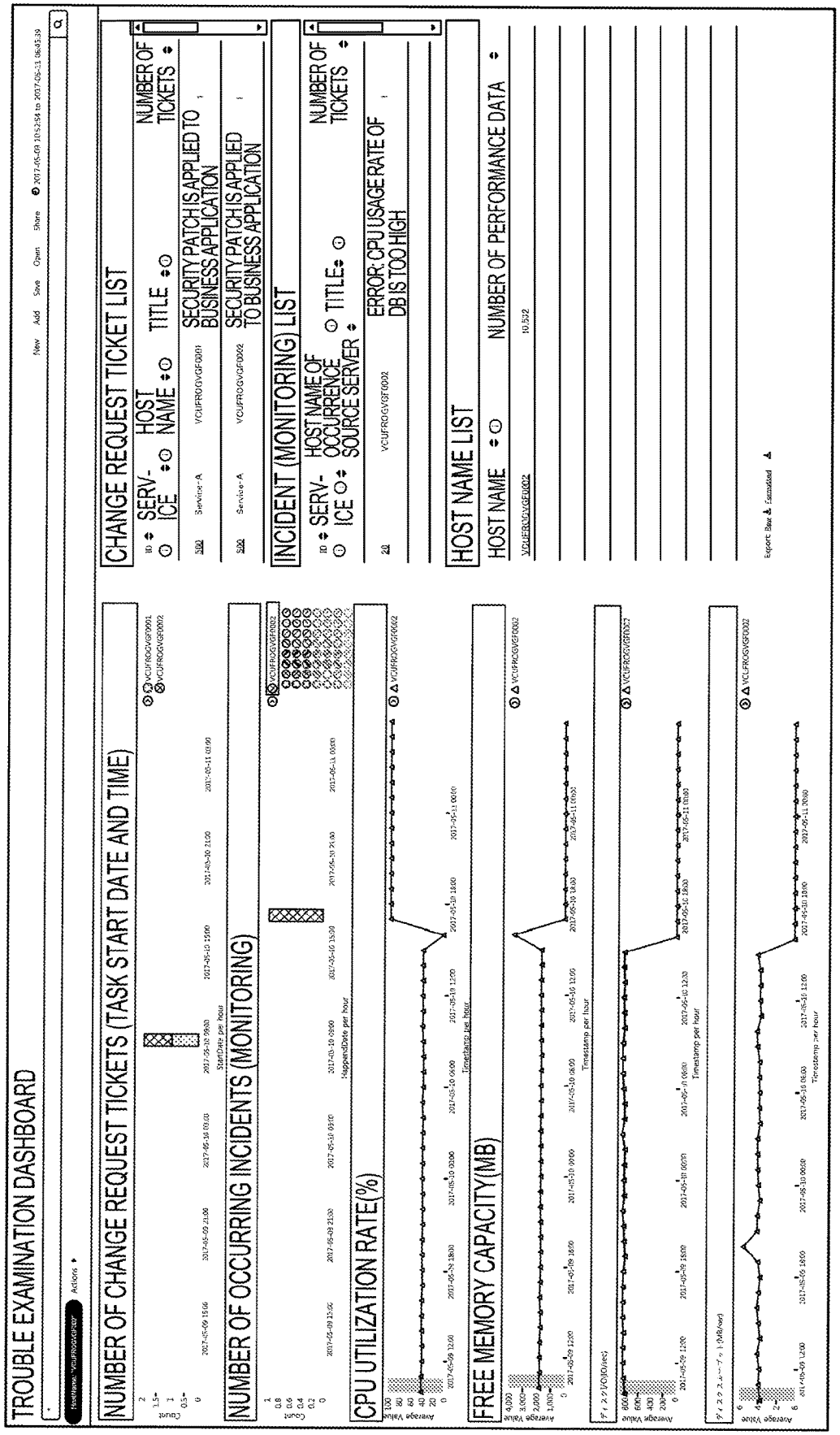
FIG. 10 is a diagram illustrating an example of a time zone compression result according to the first embodiment.

The time zone specifying unit 135 of the display control device 100 compresses the information of the selected time zone 1012 in the information illustrated in FIG. 8. In the embodiment, the time zone specifying unit 135 compresses information having a range of the selected time zone 1012 "2017-05-0915:00" to "2017-05-1103:00." Then, the screen output unit 133 causes the operator terminal 800 to display information on a compressed range through the communication unit 110. FIG. 10 is a diagram illustrating an example of a time zone compression result according to the first embodiment. As illustrated in FIG. 10, in the time zone compression result, information limited to the selected time zone is displayed. As a result, the display control device 100 may suppress display of information in a time zone in which the influence degree is considered to be low with respect to the operator of the operator terminal 800.

[Flow of Processing]

Figure 11:
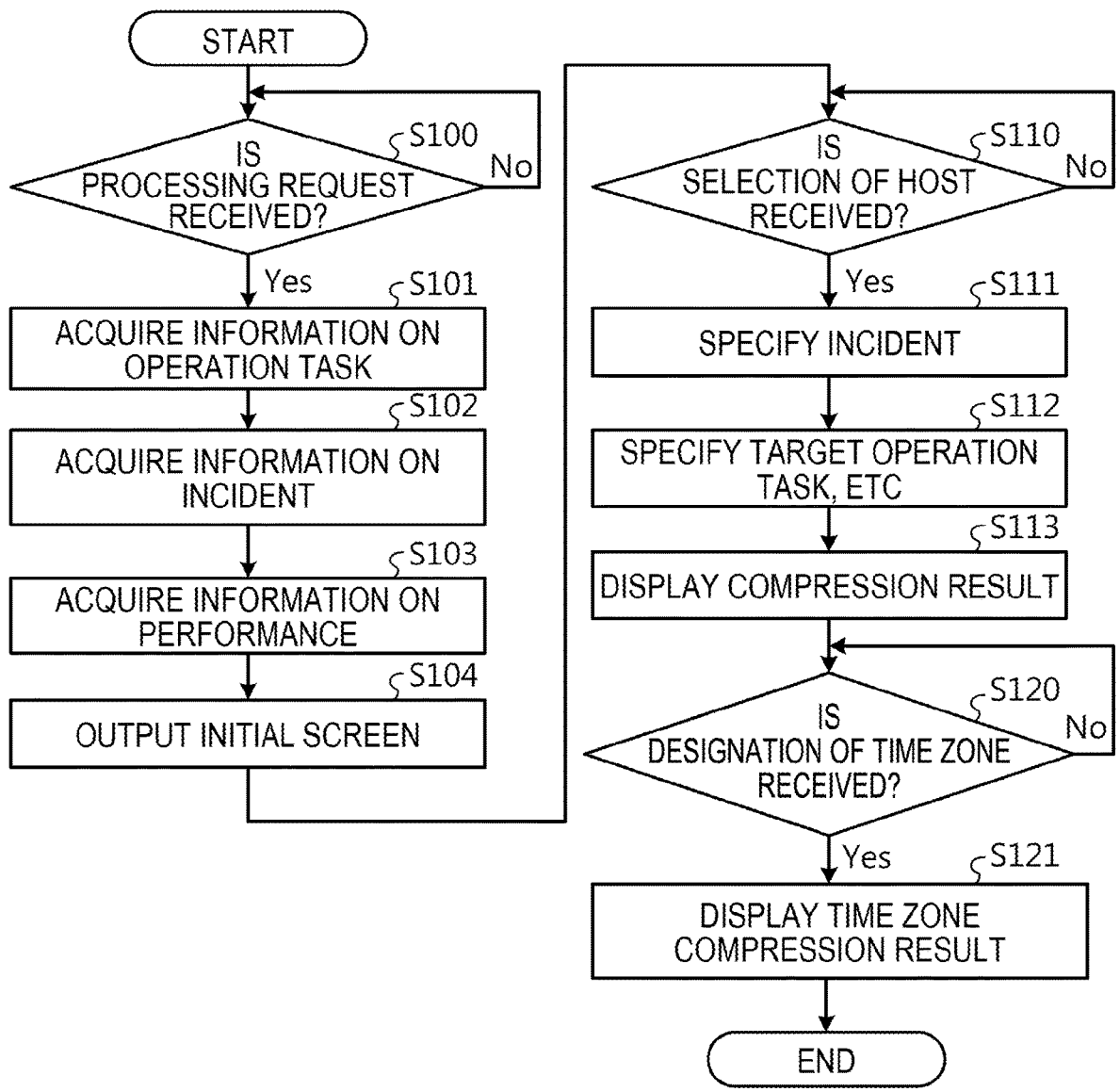
FIG. 11 is a flowchart illustrating an example of a display control process according to the first embodiment.

Next, the processing in the embodiment will be described with reference to FIG. 11. FIG. 11 is a flowchart illustrating an example of a display control process according to the first embodiment. As illustrated in FIG. 11, the receiving unit 131 of the display control device 100 waits until receiving a processing request from the operator terminal 800, for example, through the communication unit 110 (S100: No).

When it is determined that the processing request is received (S100: Yes), the receiving unit 131 outputs a processing start instruction to the data acquisition unit 132. The data acquisition unit 132 acquires information on an operation task from the operation management system 600 (S101). Further, the data acquisition unit 132 acquires the information on an incident from the monitoring system 700 (S102). Further, the data acquisition unit 132 acquires information on performance from the monitoring system 700 (S103). In addition, the data acquisition unit 132 outputs the acquired information to the screen output unit 133.

The screen output unit 133 generates the initial screen illustrated in FIG. 6, for example, using the information output from the data acquisition unit 132 and outputs the generated initial screen to the operator terminal 800 through the communication unit 110 (S104). In addition, the receiving unit 131 waits until receiving the selection of the host from the operator terminal 800 (S110: No).

When it is determined that the selection of the host is received (S110: Yes), the receiving unit 131 outputs the host compression instruction to the host specifying unit 134. The host specifying unit 134 specifies the incident which occurs in the selected host by referring to the storage unit 120 (S111). Further, the host specifying unit 134 specifies the operation task for the selected host by referring to the storage unit 120 (S112). In addition, the host specifying unit 134 outputs the information on the specified incident and operation task to the screen output unit 133. The screen output unit 134 generates the information of the screen related to the host compression result illustrated in FIG. 8, for example, using the output information and outputs the generated information to the operator terminal 800 (S113). Thereafter, the receiving unit 131 waits until receiving designation of the time zone from the operator terminal 800 (S120: No).

When it is determined that the designation of the time zone is received (S120: Yes), the receiving unit 131 outputs the time zone compression instruction to the time zone specifying unit 135. The time zone specifying unit 135 compresses the information on the operation task to the information included in the designated time zone by referring to the storage unit 120 and outputs the compression result to the screen output unit 133. The screen output unit 133 generates the information of the screen related to the time zone compression result illustrated in FIG. 10, for example, using the output information and outputs the generated information to the operator terminal 800 (S121).

[Effects]

As described above, the display control device according to the embodiment refers to the storage unit that stores the information on the operation task performed on each of the plurality of devices included in the system in association with each of the plurality of devices. The display control device extracts the device in which the number of operation tasks performed during the specific period satisfies the criterion among the plurality of devices and displays the information on the operation task performed during the corresponding specific period to the device on the display unit in association with the corresponding device. When the display control device receives the designation of the time or the time zone, the display control device newly extracts the device in which the number of operation tasks performed during the period depending on the designated time or time zone satisfies the criterion among the plurality of devices by referring to the storage unit. The display control device displays on the display unit the information on the operation task performed during the period for the newly extracted device in association with the corresponding device. As a result, it is possible to compress the task having a high degree of influence on the event and to suppress display of the information on the operation task having a low influence degree on the event which occurs at the designated time or time zone.

The display control device according to the embodiment extracts at least any one of the device in which the number of operation tasks performed during the specific period is equal to or larger than a predetermined threshold and the device in which a rank of the number of operation tasks is equal to or higher than a predetermined rank among the plurality of devices. As a result, it is possible to suppress the display of the information on the operation task having the low influence degree on the event which occurs at the designated time or time zone.

The display control device in the embodiment displays the information on the incident which occurs during the specific period on the display unit in association with the device in which the incident occurs. The display control device according to the embodiment newly extracts the device of the same type as the device in which the selected specific incident occurs upon receiving selection of any one of the displayed information relating to the specific incident. As a result, it is possible to compress a device in which the same incident is highly likely to occur.

The display control device according to the embodiment, upon receiving selection of any one of the information on the specific operation task displayed on the display unit, newly extracts the device in which the number of operation tasks performed during the time zone depending on the time or time zone when the selected specific operation tasks are performed satisfies the criterion. Further, the display control device according to the embodiment may newly extract the device of the same type as the device that is the target of the selected specific operation task or may newly extract the device that is the target of the operation task to which the identification information common to the selected specific operation task is assigned. As a result, it is possible to compress the task having the high influence degree on the event.

In response to a request for information to the business system, the display control device according to the embodiment may acquire the performance information of each of the plurality of devices included in the business system and the time when the performance information is measured. The display control device may acquire the information on the operation task performed with respect to each of the plurality of devices and the time when the operation task is performed in response to the request for the information to the management system that manages the operation task performed with respect to the plurality of devices. The display control device may display on the display unit the performance information associated with the time within the specific period out of the acquired performance information and the information on the operation task associated with the time within the specific period in the acquired information on the operation task. As a result, it is possible to suppress the display of the information on the operation task having the low influence degree on the event which occurs at the designated time or time zone.

Second Embodiment

Although embodiments of the present disclosure have been described so far, the present disclosure may be implemented in various different forms in addition to the above-mentioned embodiments. Further, each illustrated process is not limited to the above-described order, and may be executed at the same time as long as the processing contents do not conflict or may be executed in a changed order.

For example, although the configuration in which the display control device 100 acquires the information from the operation management system 600 and the monitoring system 700 via the communication unit 110 every display control processing has been described, the embodiment is not limited thereto. For example, the display control device 100 may be configured to acquire the information from the operation management system 600 and the monitoring system 700 in advance and store the acquired information in advance in the storage unit 120. In this case, the screen output unit 133, the host specifying unit 134, and the time zone specifying unit 135 may be configured to perform processing with reference to the storage unit 120.

[Distribution and Integration]

Each component of each device illustrated needs not particularly be configured as physically illustrated. That is, a concrete form of distribution and integration of each device is not limited to the illustration and all or some units may be configured to be functionally or physically distributed and integrated by a predetermined unit according to various loads or use situations. For example, an receiving unit 131, a data acquisition unit 132, a screen output unit 133, a host specifying unit 134, and a time zone specifying unit 135 may be mounted on an operator terminal 800. Further, the host specifying unit 134 and the time zone specifying unit 135 may be integrated and the data acquisition unit 132 may be distributed to a processing unit that acquires the information from the operation management system 600 and a processing unit that acquires the information from the monitoring system 700.

Each illustrated process is not limited to the above-described order, and may be executed at the same time as long as the processing contents do not conflict or may be executed in an order changed. For example, in FIG. 11, prior to receiving the selection of the host illustrated in S110, the designation of the time zone illustrated in S120 may be received, and the selection of the host may be received after designating the time zone.

All or predetermined some of various processing functions performed by each device may be executed on a CPU (or microcomputer such as an MPU, or a micro controller unit (MCU)). In addition, all or predetermined some of various processing functions may be executed on a program interpreted and executed by the CPU (or microcomputer such as an MPU, or a micro controller unit (MCU)) or hardware by a wired logic.

Figure 12:
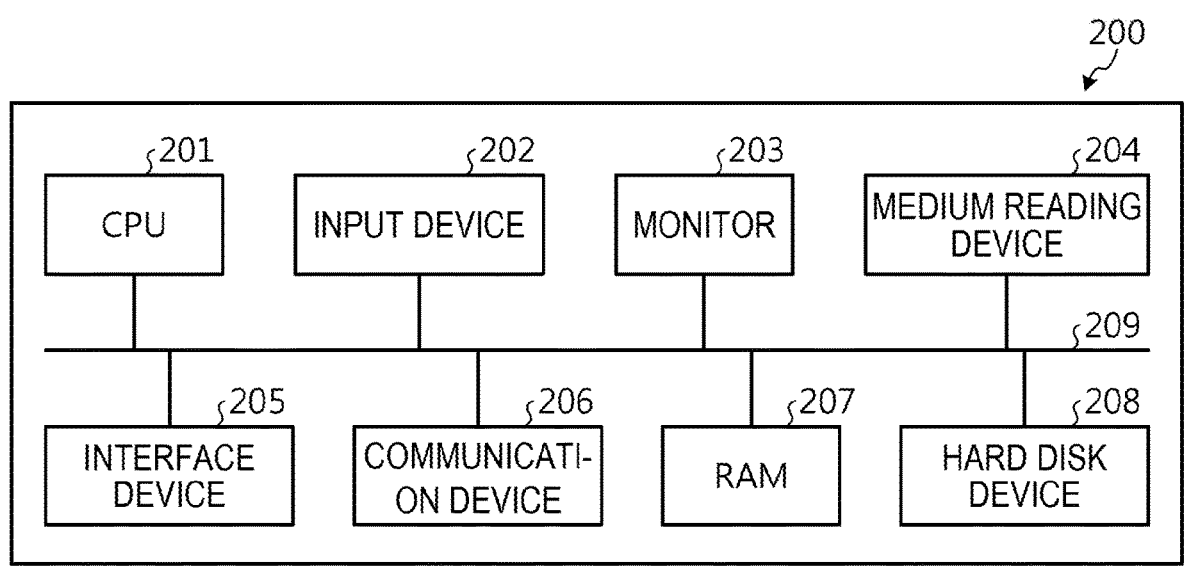
FIG. 12 is a diagram illustrating an example of a computer that executes a display control program.

However, various processing described in the embodiment may be implemented by executing a previously prepared program by means of the computer. Therefore, in the following, an example of a computer that executes a program having the same function as the above embodiment will be described. FIG. 12 is a diagram illustrating an example of a computer that executes a display control program.

As illustrated in FIG. 12, the computer 200 has a CPU 201 that executes various operation processing, an input device 202 that receives a data input, and a monitor 203. The computer 200 further includes a medium reading device 204 for reading, for example, the program from a storage medium, an interface device 205 for connecting to various devices, and a communication device 206 for connecting to, for example, another information processing device in a wired or wireless manner. Further, the computer 200 has a RAM 207 for temporarily storing various kinds of information and a hard disk device 208. In addition, each of the devices 201 to 208 is connected to a bus 209.

The hard disk device 208 stores display control programs having functions similar to respective processing units of the receiving unit 131, the data acquisition unit 132, the screen output unit 133, the host specifying unit 134, and the time zone specifying unit 135 illustrated in FIG. 5. Further, the hard disk device 208 stores various data for carrying out the display control program. The input device 202 receives the input of various kinds of information such as operation information from a user of the computer 200, for example. For example, the monitor 203 displays various screens including, for example, a display screen to the user of the computer 200. The medium reading device 204 reads various data including, for example, captured images, and CAD data. For example, a printing device is connected to the interface device 205. For example, the communication device 206 has a function similar to that of the communication unit 110 illustrated in FIG. 5 and is connected to a network, and exchanges various kinds of information with other information processing devices such as the operation management system 600, the monitoring system 700, and the operator terminal.

The CPU 201 reads each program stored in the hard disk device 208, and develops and executes the read program in the RAM 207, thereby performing various processing. In addition, the program may cause the computer 200 to serve as the receiving unit 131, the data acquisition unit 132, the screen output unit 133, the host specifying unit 134, and the time zone specifying unit 135 illustrated in FIG. 5.

The above display control program is not necessarily stored in the hard disk device 208. For example, the computer 200 may read and execute a program stored in a storage medium readable by the computer 200. The storage medium readable by the computer 200 corresponds to, for example, a portable recording medium such as a CD-ROM, a DVD disk, or a universal serial bus (USB) memory, a semiconductor memory such as a flash memory, or a hard disk drive. In addition, the display control program may be stored in a device connected to, for example, a public line, the Internet, or a LAN and the computer 200 may read and execute the display control program from the device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable non-transitory recording medium storing a program that causes a computer to execute a procedure, the procedure comprising:
referring to data including information on an operation task performed with respect to each of a plurality of devices, the data being associated with each of the plurality of devices;
extracting a first device, among the plurality of devices, in which a number of operation tasks performed during a specific period satisfies a first threshold value;
displaying the information on the operation task performed during the specific period with respect to the first device, in association with the first device in which the number of operation tasks satisfies the first threshold value;
upon receiving designation of a time or a first time zone, referring to the data including the information on the operation task;
extracting a second device, among the plurality of devices, in which the number of operation tasks performed in a second time zone depending on the time or the first time zone satisfies a second threshold value; and
displaying the information on the operation task performed in the second time zone with respect to the second device, in association with the second device in which the number of operation tasks satisfies the second threshold value,
wherein: in the displaying of the information on the operation task performed during the specific period, information on an incident which occurs during the specific period is displayed in association with a device in which the incident occurs;
if the information on the operation task is displayed for both the first device and for the second device, the operation task is identified to have a high degree of influence on the incident; and
the display of information on the operating task is suppressed when the first threshold and second threshold are not satisfied.

2. The computer-readable non-transitory recording medium according to claim 1,
wherein, in the extracting the second device, upon receiving any one of the information on the operation task performed in the second time zone, a device in which the number of operation tasks performed in the second time zone satisfies the second threshold value is newly extracted.

3. The computer-readable non-transitory recording medium according to claim 2, wherein, in the extracting of the second device, a device of a same type as a device which becomes a target of the received information on the operation task is newly extracted.

4. The computer-readable non-transitory recording medium according to claim 2,
wherein, in the extracting of the second device, a device which becomes a target of the operation task to which identification information common to the received information on the operation task is assigned is newly extracted.

5. The computer-readable non-transitory recording medium according to claim 1,
wherein, in the extracting the first device, at least any one of a device in which the number of operation tasks performed during the specific period is equal to or larger than the first threshold value among the plurality of devices and a device in which a rank of the number of operation tasks is equal to or higher than a predetermined rank among the plurality of devices is extracted, and
wherein, in the extracting of the second device, at least any one of a device in which the number of operation tasks performed in the second time zone is equal to or larger than the second threshold value among the plurality of devices and a device in which the rank of the number of operation tasks is equal to or higher than the predetermined rank among the plurality of devices is extracted.

6. The computer-readable non-transitory recording medium according to claim 1,
wherein, in the extracting of the second device, upon receiving any one of the information on the incident, a device of a same type as a device in which the incident occurs is newly extracted.

7. A display control method comprising:
referring to data including information on an operation task performed with respect to each of a plurality of devices, the data being associated with each of the plurality of devices;
extracting a first device, among the plurality of devices, in which a number of operation tasks performed during a specific period satisfies a first threshold value;
displaying the information on the operation task performed during the specific period with respect to the first device, in association with the first device in which the number of operation tasks satisfies the first threshold value;

upon receiving designation of a time or a first time zone, referring to the data including the information on the operation task;
extracting a second device, among the plurality of devices, in which the number of operation tasks performed in a second time zone depending on the time or the first time zone satisfies a second threshold value; and
displaying the information on the operation task performed in the second time zone with respect to the second device, in association with the second device in which the number of operation tasks satisfies the second threshold value, by a processor,
wherein: in the displaying of the information on the operation task performed during the specific period, information on an incident which occurs during the specific period is displayed in association with a device in which the incident occurs;
if the information on the operation task is displayed for both the first device and for the second device, the operation task is identified to have a high degree of influence on the incident; and
the display of information on the operating task is suppressed when the first threshold and second threshold are not satisfied.

8. A display control device comprising: a memory; and
a processor coupled to the memory and the processor configured to:
refer to data including information on an operation task performed with respect to each of a plurality of devices, the data being associated with each of the plurality of devices;
extract a first device, among the plurality of devices, in which a number of operation tasks performed during a specific period satisfies a first threshold value;
display the information on the operation task performed during the specific period with respect to the first device, in association with the first device in which the number of operation tasks satisfies the first threshold value;
upon receiving designation of a time or a first time zone, refer to the data including the information on the operation task;
extract a second device, among the plurality of devices, in which the number of operation tasks performed in a second time zone depending on the time or the first time zone satisfies a second threshold value; and
display the information on the operation task performed in the second time zone with respect to the second device, in association with the second device in which the number of operation tasks satisfies the second threshold value,
wherein: when the information on the operation task performed during the specific period is displayed, information on an incident which occurs during the specific period is displayed in association with a device in which the incident occurs;
if the information on the operation task is displayed for both the first device and for the second device, the operation task is identified to have a high degree of influence on the incident; and
the display of information on the operating task is suppressed when the first threshold and second threshold are not satisfied.

* * * * *